United States Patent
Kull

(10) Patent No.: US 9,027,857 B2
(45) Date of Patent: May 12, 2015

(54) SWITCHABLE HAND SHOWER

(75) Inventor: Thomas Kull, Rupperswil (CH)

(73) Assignee: KWC AG, Unterkulm (CH)

( * ) Notice: Subject to any disclaimer, the term of this patent is extended or adjusted under 35 U.S.C. 154(b) by 238 days.

(21) Appl. No.: 13/419,000

(22) Filed: Mar. 13, 2012

(65) Prior Publication Data
US 2012/0233768 A1 Sep. 20, 2012

(30) Foreign Application Priority Data
Mar. 14, 2011 (EP) .................................... 11002079

(51) Int. Cl.
B05B 1/16 (2006.01)
B05B 1/18 (2006.01)
B05B 12/00 (2006.01)
B05B 15/00 (2006.01)
E03C 1/04 (2006.01)
B05B 15/02 (2006.01)
B29L 31/00 (2006.01)
B29C 45/16 (2006.01)

(52) U.S. Cl.
CPC . B05B 1/185 (2013.01); B05B 1/16 (2013.01); B05B 1/1627 (2013.01); B05B 1/18 (2013.01); B05B 1/1609 (2013.01); B05B 12/002 (2013.01); B05B 15/00 (2013.01); B05B 15/02 (2013.01); E03C 1/0409 (2013.01); B29L 2031/7696 (2013.01); B29C 45/1676 (2013.01)

(58) Field of Classification Search
CPC ...... B05B 1/16; B05B 1/1609; B05B 1/1627; B05B 1/18

USPC .......... 239/443, 444, 445, 446, 447, 448, 449
See application file for complete search history.

(56) References Cited

U.S. PATENT DOCUMENTS

| 5,383,604 | A | * | 1/1995 | Boesch .......................... 239/447 |
| 7,344,095 | B1 | * | 3/2008 | Hsu ................................ 239/589 |
| 2002/0185553 | A1 | * | 12/2002 | Benstead et al. ........... 239/428.5 |
| 2004/0112985 | A1 | | 6/2004 | Malek et al. |
| 2004/0227014 | A1 | * | 11/2004 | Williams et al. .............. 239/443 |
| 2005/0161533 | A1 | * | 7/2005 | Nobili ............................ 239/447 |
| 2007/0221757 | A1 | * | 9/2007 | Malek et al. .................. 239/447 |

FOREIGN PATENT DOCUMENTS

| DE | 93 14 443.1 U1 | 1/1994 |
| DE | 201 08 057 U1 | 10/2001 |
| DE | 10 2005 059 999 A1 | 6/2007 |
| EP | 1 418 007 A2 | 5/2004 |

* cited by examiner

Primary Examiner — Ryan Reis
(74) Attorney, Agent, or Firm — Oliff PLC

(57) ABSTRACT

A hand shower has outer housing including a first housing part and a second housing part, is disposed in the interior of the outer housing. The first housing part is produced by dual-component injection molding and has a support formed from a hard component. Alongside the switching device, this support is provided with a passage. A soft component, injected onto the outer side of the support covers the passage in a membrane-like manner. The membrane region of the soft component is elastically deformable to allow the switching device to be operated from the surroundings.

16 Claims, 5 Drawing Sheets

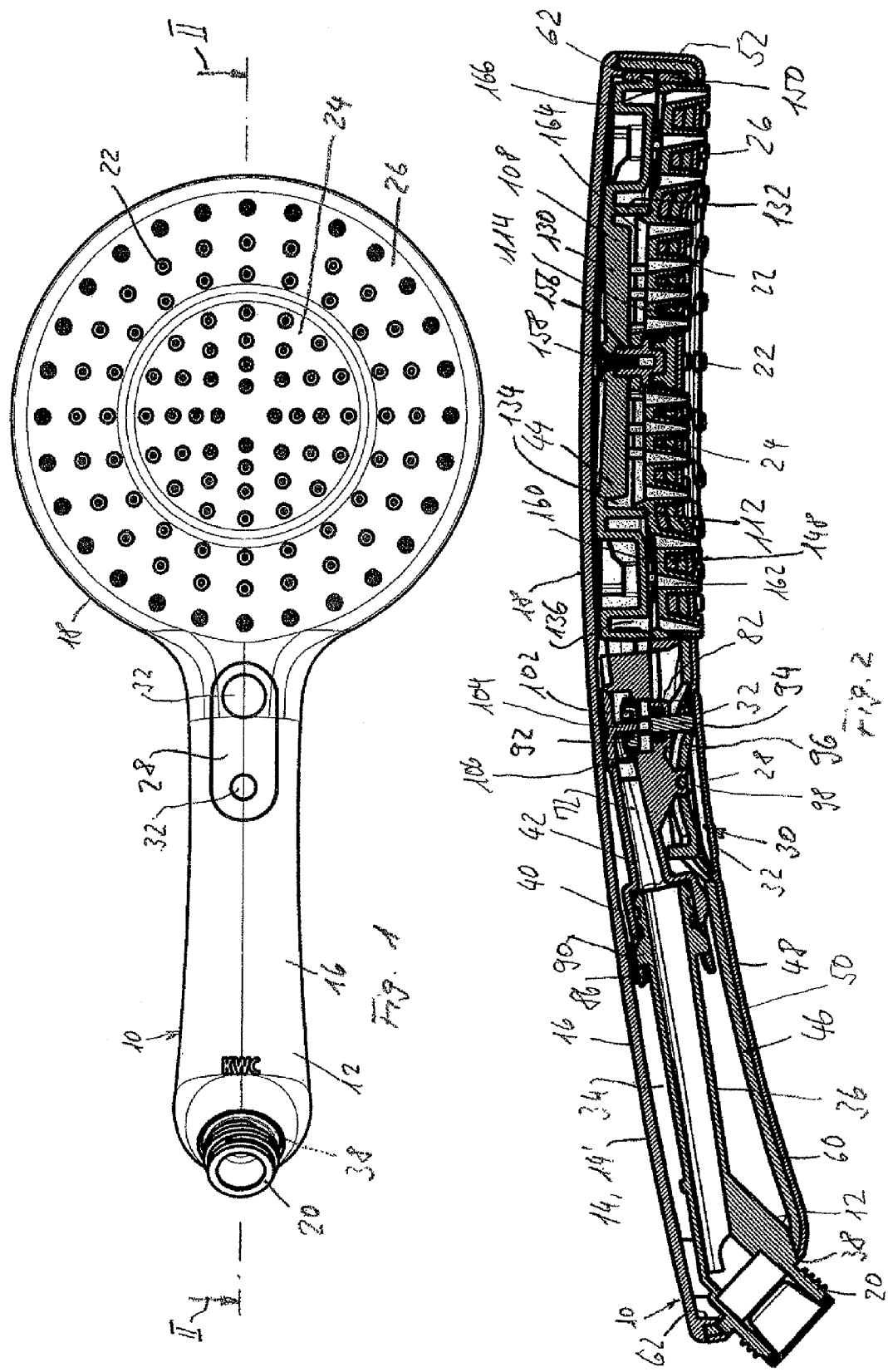

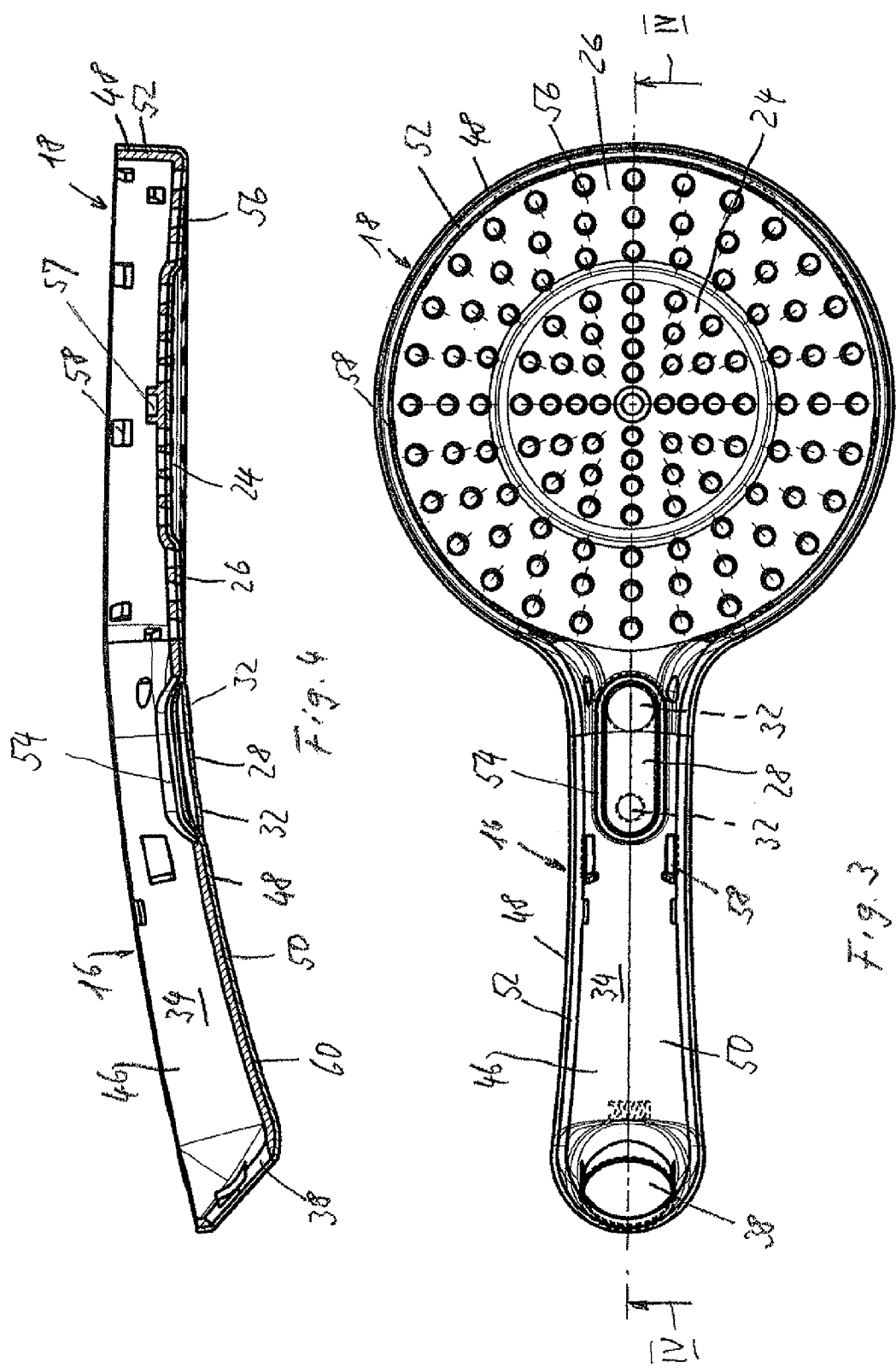

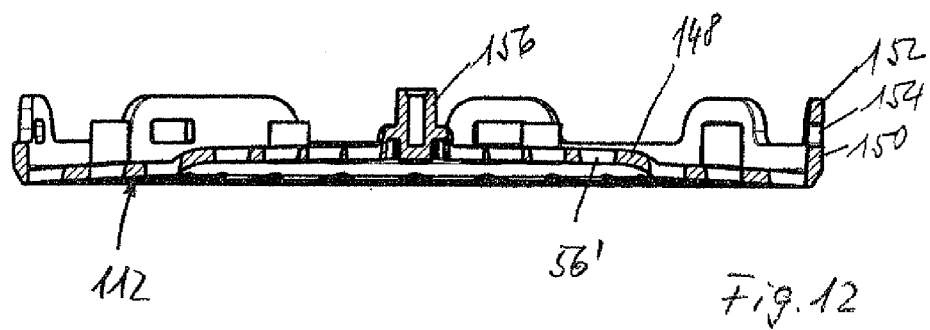
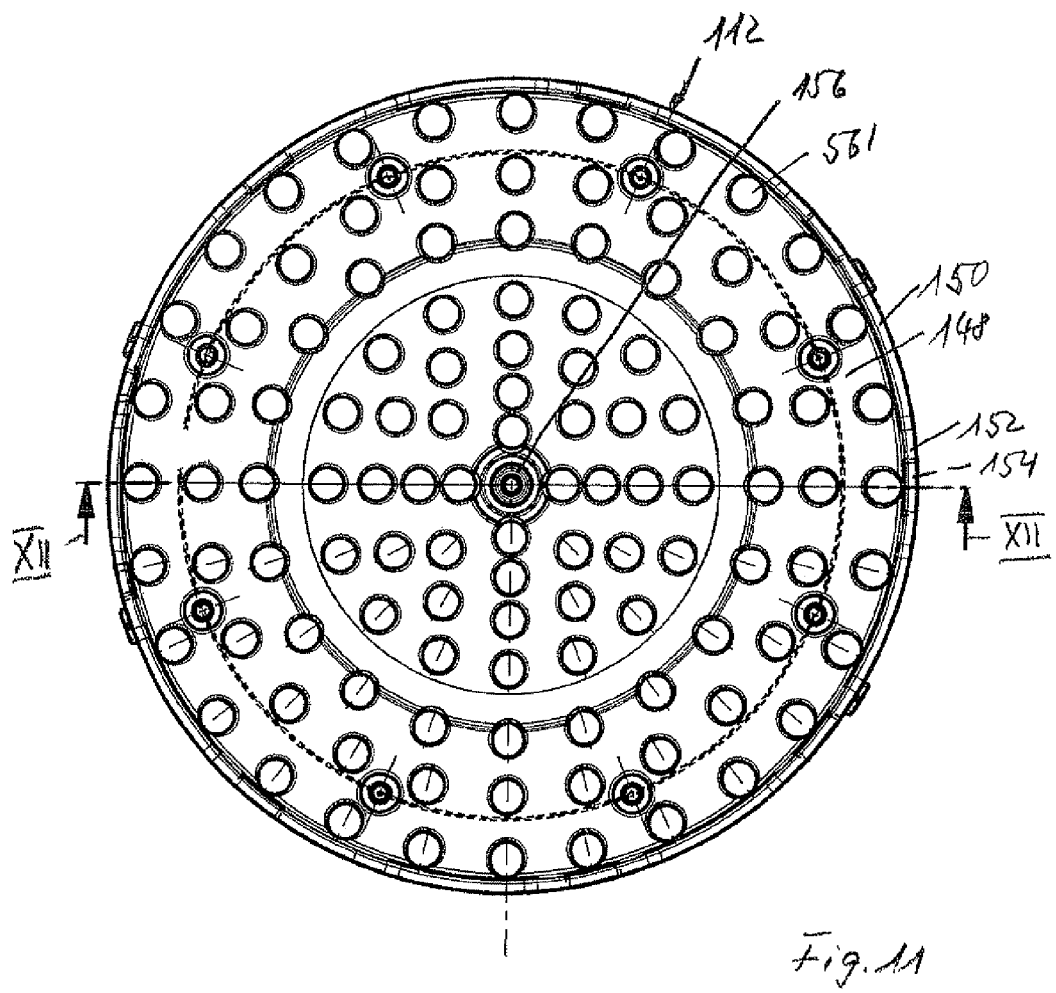

SWITCHABLE HAND SHOWER

BACKGROUND

Hand showers, which have a switching device inside an outer housing, are commonly known. In traditional hand showers of this kind, the outer housing has alongside the switching device an opening in which, for sealing off from the surroundings, an elastomeric membrane element produced as a separate part is inserted. By deformation of the membrane element, the switching device can be actuated from the surroundings.

SUMMARY

The exemplary embodiments provide a hand shower having a switching device, which hand shower is easy to produce and ensures a reliable seal.

The hand shower according to an exemplary embodiment has an outer housing that delimits an interior and defines a handle region and a head region. The outer housing has a first housing part and a second housing part. A switching device is disposed in the interior of the outer housing. The hand shower further has a water supply connection, usually disposed at the free end of the handle region, and in the region of the head region has water jet discharge openings, which are flow-connected to the water supply connection.

According to the exemplary embodiment, at least the first housing part is produced by dual-component or multicomponent injection molding. The first housing part has a dimensionally stable support made of a hard component, and, alongside the switching device, a passage running from the interior to that outer side of the support that is facing away from the interior. This passage is closed off from the surroundings in a membrane-like manner by a soft component molded onto the support by multicomponent injection molding. The elastomeric properties of the soft component allow the switching device to be actuated from the surroundings by deformation of the soft component in the region of the passage.

Particularly preferably, affine materials, which in the injection molding process enter into a material bond with one another, are used as the hard component and the soft component.

Preferably, the first housing part extends over the—entire—handle region and the—entire—head region, and the passage, and thus the switching device, is located in the handle region. This allows, on the one hand, one-handed operation of the hand shower and, on the other hand, the configuration of the hand shower as a planar shower. In planar showers, the head part, in particular, has a small thickness.

In a further, particularly preferred embodiment, the support is of shell-like configuration, forming a base part and a casing part protruding peripherally from the base part. The second housing part here preferably forms a cover, which in particular is fixedly connected, preferably sealingly, to the free edge of the casing part.

The second housing part, too, is preferably made as an injection molded part. The second housing part can be produced by single-component injection molding, or by dual-component or multicomponent injection molding. The second housing part is preferably of dimensionally stable configuration and can have a surface treatment, for example a metallization.

The connection between the first housing part and the second housing part is realized in a commonly known manner, for example by means of an adhesive bond, by molding, by snap joints, etc., or combinations thereof.

In the head region, the base part of the first housing part can have the water jet discharge openings. These can be configured, for example, on pimples formed by the soft component. Calcium deposits can thereby be prevented and, in particular, through the possibility of elastic deformation of the pimples, any calcium deposits present can be detached.

Particularly preferably, the base part has in the head region, however, water outlet passages, which are passed through by water outlet extensions of a component disposed in the interior. In this case, the outer housing itself is not water-carrying.

Preferably, the soft component covers the passage fully and the outer side of the support at least around the passage. An extensive connecting region of the soft component to the hard component can here be created in the course of the injection molding.

Particularly preferably, the soft component covers at least approximately the entire outer side of the support. Particularly preferably, the soft component continuously covers the entire outer side of the support, which would otherwise be exposed to the surroundings.

The switching device can be constituted, for example, by a switching valve, for switching a light source built into the hand shower.

The switching device can also, however, have a switching valve for producing different water jet patterns and water jet characteristics.

The switching device preferably has a valve housing, which is provided with an inlet opening flow-connected to the water supply connection. The valve housing further has outlet openings connected to the water jet discharge openings. Inside the valve housing is disposed a valve member, which can be actuated from the surroundings via a soft component of membrane-like configuration.

Preferably, the inlet opening is permanently connected to a first of the outlet openings. The second of the outlet openings is connected to the inlet opening preferably only when the valve member is in the open setting. This allows, for example, two different water flow rates to be set. If the two outlet openings are connected to different water jet discharge openings, however, there is the facility to feed water to just the water jet discharge openings connected to the first outlet opening, or additionally also to the water jet discharge openings connected to the second outlet opening.

In a preferred embodiment, on the valve housing is mounted an actuating lever, which is connected to the valve member for the switchover thereof. The actuating lever is preferably configured as an actuating rocker. For the switching of the switching device, the soft component is deformed in the region of the passage and hereupon acts upon the actuating lever. The soft component may be deformed by surroundings, for example, by pressing upon the soft component.

In a particularly preferred embodiment, in the head region an inner housing is disposed in the interior. This is connected to the switching device, in particular to the outlet openings thereof. The inner housing preferably consists of an outlet part and a cover part fixedly and sealingly connected thereto. The outlet part here has water outlet extensions, at the free ends of which are configured the water jet discharge openings. These water outlet extensions pass through the water outlet passages of the base part.

The cover part and the outlet part are of dimensionally stable configuration and, to this effect, preferably have a hard component. It is here possible to produce both the cover part and the outlet part from a hard component and, by dual-component injection molding, to inject the water outlet extensions, made of a soft component, onto the hard component of the outlet part.

In a particularly preferred embodiment, the outlet part has, however, an outlet shell part that is produced in particular by injection molding—in particular from a hard component—and in which an insert part made of an elastomeric material is inserted. In this case, the water outlet extensions, which pass through the water outlet passages of the base part, are formed by the insert part. Since the insert part can be produced from elastomeric material, it can further assume sealing functions, for instance to seal off the inner housing from the interior of the outer housing. The insert part preferably covers the inner side of the outlet part.

In another embodiment, the cover part is preferably fixedly connected to the outlet shell part, for example, by means of snap joints. Of course, other fastening options, such as screw joints, or combinations of fastening options, are also conceivable.

The inner housing preferably forms a first chamber, connected only to the first outlet opening of the valve housing, and a second chamber, connected only to the second outlet opening of the valve housing. These chambers feed the water jet discharge openings that are assigned to them.

In a particularly preferred embodiment, the first chamber is located in the middle of the head region and preferably has a circular-ring-shaped cross section. The second chamber preferably extends in a ring-like manner around the first chamber.

If just the first chamber is fed with water, a corresponding jet pattern, comprising, if need be, more intensive jets than if both chambers are fed with water, is obtained.

If the outlet part has an insert part made of elastomeric material, this can serve in a particularly simple manner for the mutual sealing of the two chambers, in that the cover part forms a partition that bears with its free edge against the insert part.

A PBT, preferably (for example 20%) reinforced with glass fibers, is particularly suitable as the hard component for the support. The soft component can be constituted, for example, by a silicone layer—LSR. The water-carrying parts can be produced, for example, from POM and, as material for the second housing part, ABS, for example, can be used. Of course, other material choices are possible.

BRIEF DESCRIPTION OF THE DRAWINGS

The present invention is explained in greater detail with reference to illustrative embodiments represented in the drawing, in which, purely schematically:

FIG. 1 shows in bottom view an embodiment of a hand shower according to the invention, which is configured as a planar shower;

FIG. 2 shows a longitudinal section through the hand shower according to FIG. 1 along the line II-II;

FIG. 3 shows in top view—view onto the inner side—a first housing part of the hand shower, produced by dual-component injection molding;

FIG. 4 shows in a section along the line IV-IV of FIG. 3 the first housing part;

FIG. 11 shows in top view an outlet shell part of the inner housing; and

FIG. 12 shows in a section along the line XII-XII of FIG. 11 the outlet shell part.

DETAILED DESCRIPTION OF EMBODIMENTS

Figure 6:
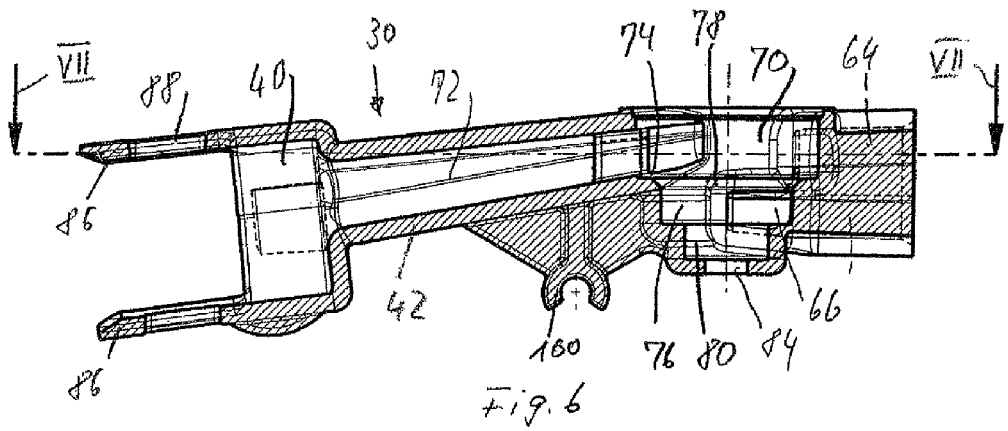
FIG. 6 shows in a section along the line VI-VI of FIG. 5.

FIG. 1 shows a hand shower according to an exemplary embodiment in bottom view. This hand shower has an outer housing 10, of which only a first housing part 12 is visible in FIG. 1. A second housing part 14, forming a cover 14', is shown in FIG. 2.

The outer housing 10, may consists of the first housing part 12 and the second housing part 14, and defines a handle region 16 and a head region 18 of the hand shower. At the free end of the handle region 16 a water supply connection 20 is disposed, to which a shower hose is connectable in a known manner. At that end of the handle region 16, which is facing away from the water supply connection 20, the handle region is adjoined by the head region 18. In the region of the head region 18, water jet discharge openings 22 are present, through which the water making its way through the water supply connection to the hand shower is discharged, with the formation of water jets.

In the shown illustrative embodiment, the hand shower is configured as a planar shower; the thickness of the head region 18 is substantially the same as the thickness of the handle region 16—compare FIG. 2—, wherein the head region 18, viewed in bottom view or top view, has a greater extent than the handle region 16 and in the present case is of circular configuration.

The hand shower has in the head region a central first field 24 with associated water jet discharge openings 22 and, around this, an annular second field with associated water jet discharge openings 22.

In addition, a membrane region 28 of a soft component is represented, which membrane region is located in that end region of the handle region 16 that is found on the head region side. The membrane region 28 serves for the actuation of a switching device 30, from the surroundings, by deformation of the membrane region 28 by means of a finger of the user of the hand shower. The two circular regions 32 in the membrane region 28 constitute a local thickening of the membrane region 28 in order to show the user where a user must press to actuate the switching device 30.

The two housing parts 12, 14 which are fastened together, so as to be sealed, enclose or delimit an interior 34 of the outer housing 10, in which the switching device 30 is disposed. In the interior, in the handle region 16, is also located a feeder pipe part 36, which on the one hand sealingly penetrates the first housing part 12 through a corresponding supply line opening 38—see also FIGS. 3 and 4—and onto which the water supply connection 20 projecting over the outer housing 10 is molded and, on the other hand, sealingly engages in a sleeve-shaped inlet opening 40 of a valve housing 42 of the switching device 30.

Figure 5:
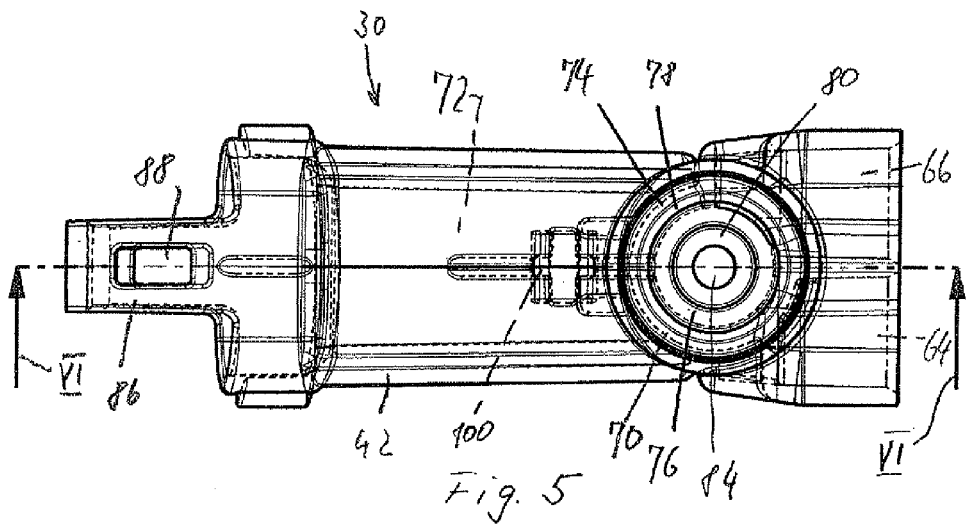
FIG. 5 shows in top view a valve housing of a switching device of the hand shower.
Figure 7:
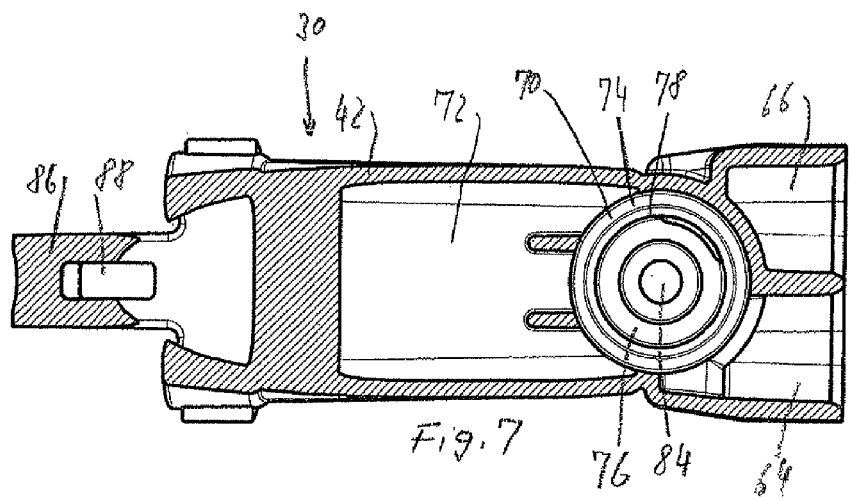
FIG. 7 shows in a section along the line of FIG. 6 the valve housing shown in FIGS. 5 and 6.

Also located in the interior 34—as can be seen in particular from FIG. 2—in the head region 18 is an inner housing 44, which is flow-connected to a first outlet opening 46 and a second outlet opening 48 of the valve housing 42; with regard to the valve housing 42, reference is made to FIGS. 5 to 7.

As can be seen in particular from FIGS. 3 and 4, the first housing part 12 is produced by dual-component injection molding. It consists of a shell-shaped support 46, made of a hard component, i.e. a hard plastic, and a soft component 48, injected like a coating onto the outer side of the support 46.

The support 46 forms a planar base part 50, which is curved in the longitudinal direction of the hand shower and from which, on the periphery, protrudes a casing part 52, which is self-contained in the peripheral direction. At the free end of the handle region 16, the casing part 52 has the inlet opening 40 for the feeder pipe part 36.

The base part 50 of the support 46 further has a passage 54 which passes from the interior 34 to the outer side of the support 46 and the shape of which corresponds to the membrane region 28.

In the head region 18, the support 46 is provided with continuous water outlet passages 56, which are assigned to the associated water jet discharge openings 20. The central first field 24 having the particular water outlet passages 56 is offset in relation to the annular second field 26 in the direction of the interior 34.

In the center of the first field 24, the base part 50 has a centering hollow pin 57, projecting in the direction of the interior 34, for centering of the inner housing 44. In addition, projections 58, which project in the direction of the interior 34, are molded onto the casing part 52, which projections serve for the positioning of components built into the outer housing 10 or for the connection (snap-in connection) of the first housing part 12 to the second housing part 14.

As can be seen in particular from FIGS. 2 and 4, the support 46, on its entire outer side 60 facing away from the interior 34, is covered by means of the soft component 48. This soft component 48 also covers the passage 54 of the support 46 and at the same time forms the membrane region 28. The soft component does not, of course, cover the inlet opening 40 and the water outlet passages 56.

It is possible to produce the first housing part 12 also from three or more components by injection molding.

As is evident from FIG. 2, the second housing part 14 is planar and is configured such that it is curved in accordance with the base part 50. It too extends, like the first housing part 12, over the entire handle region 16 and head region 18 of the hand shower. The second housing part has, at a distance to its edge corresponding to the thickness of the first housing part 12 at its edge, a lip-like, self-contained bulge 62 projecting in the direction of the interior 34, which bulge, in the assembled state, overlaps with the casing part 52 and thus serves for the mutual centering of the housing parts 12 and 14, as well as for the sealing. The bulge 62 can further have projecting spring tongues comprising an opening, which spring tongues engage with lug-like projections 58 of the support 46 to form a snap joint. In addition to or instead of a snap joint, it is possible to bond the first housing part 12 and the second housing part 14 continuously together or connect them to each other in some other way.

The second housing part 14 is preferably produced from a hard component by injection molding. Of course, it can also be produced by dual-component or multicomponent injection molding and/or be coated with a surface layer, in particular on the outer side.

The valve housing 42 of the switching device 30 disposed alongside the passage 54 in the interior 34 is shown in detailed representation in FIGS. 5-7. It has, on the one hand, the sleeve-shaped inlet opening 40 and, on the other hand, two mutually adjacent outlet openings, namely a first outlet opening 64 and a second outlet opening 66. On that side of the outlet openings 64, 66 that is facing the inlet opening 40, the valve housing 42 has a stepped, circular valve recess 68. Leading into the top region 70 of the valve recess 68 is a line portion 72 emanating from the inlet opening 40. On the other hand, the top region 70 is permanently flow-connected to the first outlet opening 64.

A circumferential, broken edge of a shoulder 74 between the top region 70 and a middle region 76 of the valve recess 68 forms a valve seat 78. This middle region 76 is permanently flow-connected to the second outlet opening 66. Located beneath the middle region 76 is a bottom region 80, which is smaller in diameter and is intended to receive a sealing ring 82, see FIG. 2. That wall of the valve housing 74, which closes off the bottom region 80, has a tappet passage 84.

The valve housing 42 further has two diametrically opposing spring tongues 86, which project in relation to the inlet opening 40. These are provided with a latching opening 88, which is intended to back-grip corresponding latching lugs 90, see FIG. 2, of the feeder pipe part 36. For the sake of completeness, it should be mentioned that the feeder pipe part 36 has in its near-side end region two circumferential grooves for the reception of O-rings, which sealingly cooperate with the inner side of the sleeve-shaped inlet opening 40.

As shown by FIG. 2, in the valve recess 68 is disposed a valve member 92 cooperating with the valve seat 78. In this embodiment, it is of mushroom-shaped configuration, wherein the head cooperates with the valve seat 78 and the stem 94, as a tappet, passes through the sealing ring 82 such that it forms a seal and is displaceable in the longitudinal direction. If the valve member 92, by bearing against the valve seat 78, is in the closed setting, only the first outlet opening 64 is flow-connected to the line portion 72 and thus to the water supply connection 20. If the valve member 72, however, by being lifted off the valve seat 78, is in the open setting, water emanating from the water supply connection can flow, on the one hand, to the first outlet opening 64 and, on the other hand, through the opened valve to the second outlet opening 66.

The valve member 92 or its stem 94 is attached by its free end to an actuating rocker 76. This is held and pivotally mounted by its bearing journals 98 on a pivot bearing 100 of the valve housing 42.

In FIG. 2, the valve is shown in its closed setting. By pressing on that circular region 32 of the membrane region 28, which lies closer to the head region 18, the valve member 92 is displaced into its open setting and, at the same time, the actuating rocker 96 is pivoted. In order to move the valve member 92 back into the closed setting, pressure is applied to the circular region 32 which is farther away from the head region 18, whereby the membrane region 28 is deformed and the rocker is correspondingly swiveled, whereby the valve member 92 is drawn into the closed setting.

For the sake of completeness, it should be mentioned that the valve recess 68 is closed off by means of a pin element 102, FIG. 2. Protruding from the middle of this is a guide shaft 104, which engages in a corresponding hole of the valve member 92. Between the valve member 92 and the guide shaft 104, an annular sealing element acts to prevent a water flow through the valve member 92.

For the sake of completeness, it should be mentioned that the valve member 92, or the head thereof, supports on the periphery a sealing ring 106, which cooperates with the valve seat 78.

Located in the head region 18, in the interior 34, is the inner housing 44. This is formed from a one-piece cover part 108—FIGS. 8 to 10—and an outlet part 110, which for its part consists of an outlet shell part 112—see FIGS. 11 and 12—and an insert part 114 inserted therein, compare FIG. 2.

Figure 9:
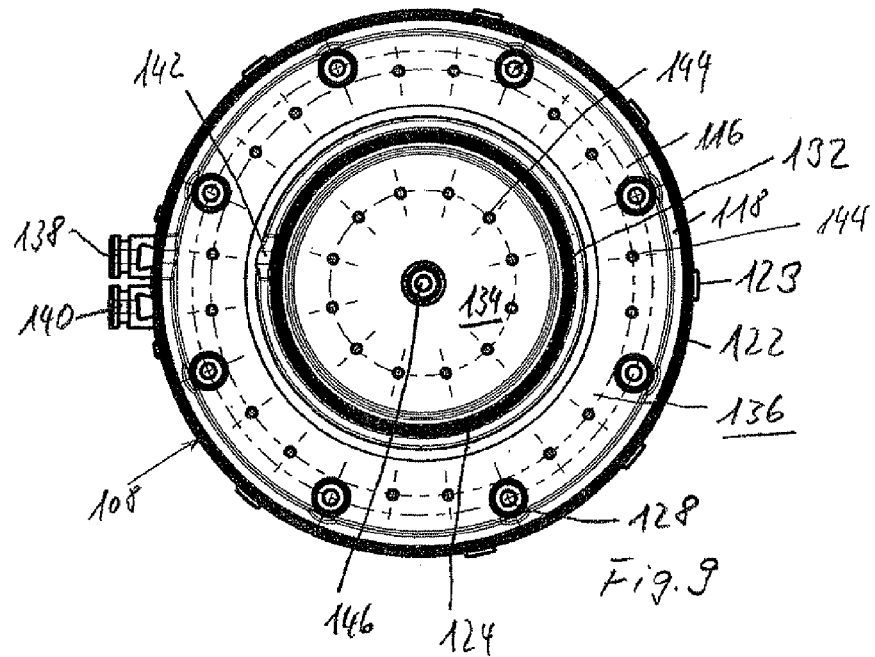
FIG. 9 shows in bottom view the cover part shown in FIG. 8.
Figure 10:
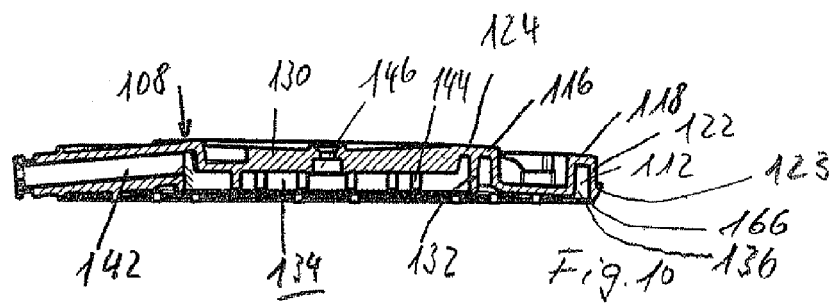
FIG. 10 shows in a section along the line X-X of FIG. 8 the cover part shown in FIGS. 8 and 9.
Figure 8:
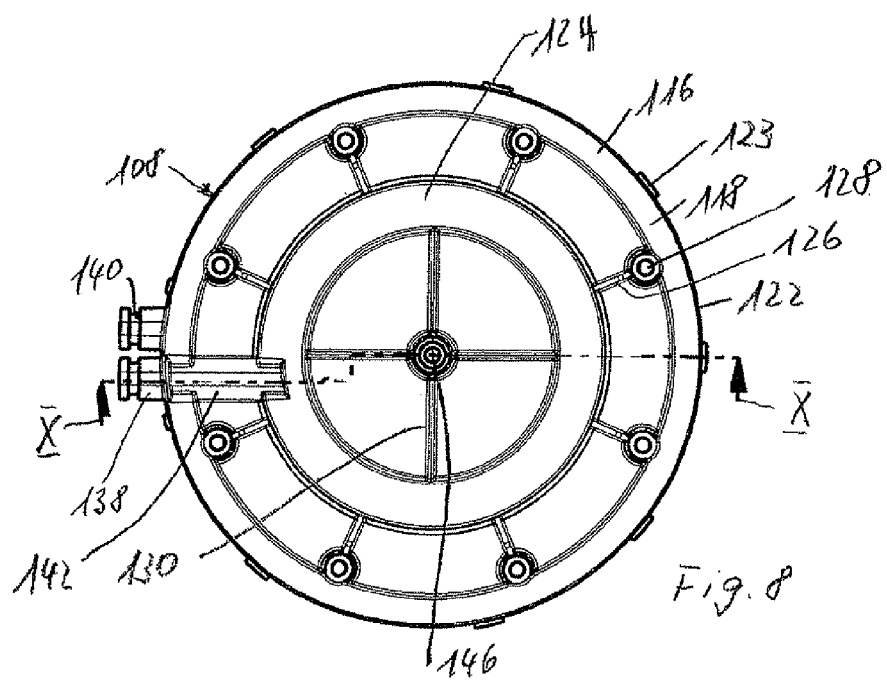
FIG. 8 shows in top view a cover part of an inner housing.

As can be seen from FIGS. 8 to 10, the circular cover part 108—produced by injection molding—is also of shell-like configuration. The shell wall is shaped radially on the outside into a circumferential, upwardly projecting bead 118, which in the downward direction, i.e. toward the inside of the inner housing 44, forms a flow groove 112. The radially outer part of the bead 118 at the same time forms the casing wall 122 of the cover part 108, and to this are molded, distributed in the peripheral direction, radially outwardly projecting snap-in lugs 123.

Offset inward in the radial direction with respect to the bead 118, the shell wall 116 is shaped into a further bead 124, which likewise projects upward. Between the bead 118 and the further bead 124, the shell wall 116 runs, annularly, in one plane, wherein running between the two beads 118, 124, evenly distributed in the peripheral direction, are supporting webs 126, which are thickened next to the bead 118 and have axially through-running bores 128, through which screws can be guided in order to screw the cover part 108 to the outlet shell part 112.

Radially on the inside with respect to the further bead 124, the shell wall 116 likewise runs in one plane, wherein further supporting webs 130, which are molded on in the shape of a cross, reinforce this region of the shell wall 116. On the lower side that is situated opposite the supporting webs 126 and the further supporting webs 130 and which faces the interior of the inner housing 44, a circumferential partition 132 protrudes downward from the further bead 124. The radially inner space with respect to this partition 132 is assigned to a first chamber 134, while the radially outer space with respect to this partition 132 is assigned to a second chamber 136.

Protruding—radially outward—from the casing wall 122, side by side and parallel to each other, are a first connecting pin 138 and a second connecting pin 140. Both connecting pins 138 and 140 have a circumferential outer groove, into which an O-ring (not shown here) is respectively mounted. In the assembled state, the first connecting pin 138 engages in the sleeve-shaped first outlet opening 64 of the valve housing 42, effecting a seal by means of the particular O-ring. Correspondingly, the second connecting pin 140 engages in the likewise sleeve-shaped second outlet opening 166, effecting a seal by means of its O-ring. From the first connecting pin 138, a peripherally closed connecting duct 142 leads into the first chamber 134. The sleeve-like first connecting pin 138 thus establishes, together with the connecting duct 142, a flow connection between the switching device 130 and the first chamber 134. Correspondingly, the likewise sleeve-shaped second connecting pin 140 establishes a flow connection between the switching device 30 and the radially outer annular second chamber 136.

For the sake of completeness, it should be mentioned that supporting pins 144 protrude from the casing wall 122 and have in the middle a screw passage 146.

As can be seen from FIGS. 11 and 12, the outlet shell part 112—produced by injection molding—is likewise of shell-like configuration. Its base portion 148 is shaped in the head region 18 in accordance with the inner side of the base part 50 of the first housing part 12 and has further water outlet passages 56' aligned with the water outlet passages 56. Protruding from the radially outer edge of the base portion 148, in the upward direction, is a circumferential casing portion 150. This has peripherally distributed, upwardly projecting spring tongue portions 152, in whose latching openings 154 engage, in the assembled state, the snap-in lugs 123 molded onto the casing wall 122; see on this point FIG. 2. Protruding centrically from the base portion 148, in the upward direction, is a fastening pin 156, which, in the assembled state, engages in the screw passage 146 of the cover part 108. The fastening pin 156 is sealingly fastened to the cover part 108 by means of a screw 158 screwed into the fastening pin 156.

On the other hand, the (on this side closed off) fastening pin projects outward and is intended to engage, in the assembled state, in the centering pin 57.

As can be seen from FIG. 2, the insert part 114 is inserted in a carpet-like manner into the outlet shell part 112, on the inner side thereof. Said insert part has a planar carpet portion 160, from which water outlet extensions 162 protrude. Each water outlet extension 162 passes through a water outlet passage 56 of the first housing part 12 and a further water outlet passage 56' of the outlet shell part 112. The water outlet extensions 162 are of sleeve-shaped configuration and have at their free ends, which project over the first housing part 12, the water jet discharge openings 22.

In the assembled state, the partition 132 of the cover part 108 bears with its free end sealingly against the planar carpet portion 160. The planar carpet portion 160 further has an upwardly projecting, circumferential sealing tongue 164, which bears sealingly against the radially inner wall of the partition 132. Radially on the outside, the insert part 114 made of an elastomeric material cooperates with its carpet portion 160, likewise as a seal, with the circumferential sealing edge 166 of the cover part 108.

In the embodiment shown in the figures, the outer housing 10 is not itself water-carrying. Only components built into the interior 34, such as the feeder pipe 136, the valve housing 42 of the switching device 30, and the inner housing 44, are water carrying. This gives the manufacture great scope for the design and choice of material of the outer housing 10.

For the secure sealing of the inner housing 44, the cover part 108 and the outlet shell part 112, in addition to the shown snap joints and screw joints, can also be welded or bonded together. The same applies to the connection between the valve housing 42 and the inner housing 44 and between the valve housing 42 and the feeder pipe part 36.

It is also conceivable that the soft component does not cover the complete outer side of the first housing part 12, but only a region of the outer side, which runs around the passage 54.

Furthermore, it is also conceivable to make the outer housing 10 itself water carrying. Both housing parts 12 and 14 can be shaped correspondingly.

What is claimed is:

1. A hand shower comprising:
   an outer housing which defines an interior, a handle region and a head region defining water jet discharge openings, the outer housing having
   a first housing part and a second housing part, wherein at least the first housing part (i) is produced by dual-component or multicomponent injection molding, (ii) has a dimensionally stable support made of a hard component, and (iii) has a soft component injected onto the dimensionally stable support;
   a switching device disposed in the interior of the outer housing;
   a water supply connection, wherein
   the water jet discharge openings are connected to the water supply connection,
   the dimensionally stable support is disposed alongside the switching device and has a passage which (i) runs from the interior of the outer housing to an outer side of the dimensionally stable support facing away from the interior, and (ii) is sealingly closed off from the surroundings in a membrane-like manner by the soft component to allow the switching device to be actuated by deformation of the soft component, the dimensionally stable support is of shell-like configuration and defines a base part and a casing part protruding peripherally from the base part, and the second housing part forms a cover and is connected to the casing part.

2. The hand shower of claim 1, wherein the first housing part extends over the handle region and the head region, and the passage is located in the handle region.

3. The hand shower of claim 1, wherein the second housing part is sealed to the casing part.

4. The hand shower of claim 1, wherein
the head region defines water outlet passages, and
the water jet discharge openings or water outlet passages are disposed in the base part.

5. The hand shower of claim 1, wherein the soft component fully covers the passage, and covers an outer side of the dimensionally stable support at least around the passage.

6. The hand shower of claim 1, wherein the soft component covers at least approximately an entire outer side of the dimensionally stable support.

7. The hand shower of claim 1, wherein the switching device has:
a valve housing defining an inlet opening connected to the water supply connection,
two outlet openings connected to the water jet discharge openings, and
a valve member, which is disposed inside the valve housing and can be actuated via deformation of the soft component,
the inlet opening being permanently connected to a first of the outlet openings and being connected to a second of the outlet openings only when the valve member is in an open setting.

8. The hand shower of claim 7, wherein on the valve housing is mounted an actuating lever, which (i) can be actuated via deformation of the soft component, (ii) is configured as an actuating rocker, and (iii) is connected to the valve member for switching thereof.

9. The hand shower of claim 7, wherein the head region defines an inner housing disposed in the interior and defines water outlet passages, the hand shower further comprises:
an outlet part and a cover part disposed in the inner housing and connected to the switching device, the outlet part having water outlet extensions comprising the water jet discharge openings, the water outlet extensions passing through the water outlet passages.

10. The hand shower of claim 9, wherein the outlet part has an outlet shell part and an insert part disposed therein produced from an elastomeric material, which insert part forms the water outlet extensions.

11. The hand shower of claim 9, wherein the inner housing forms a first chamber and a second chamber, the first chamber being connected to the first outlet opening and the second chamber being connected to the second outlet opening.

12. The hand shower of claim 11, wherein the second chamber has a ring-like configuration and peripherally encompasses the first chamber.

13. The hand shower of claim 1, wherein the cover is also of shell-like configuration.

14. The hand shower of claim 1, wherein the hand shower is configured as a planar shower, and the head region, viewed in the bottom view or top view, has a greater extent than the handle region.

15. The hand shower of claim 1, wherein the thickness of the head region is substantially the same as the thickness of the handle region.

16. The hand shower of claim 1, wherein the first and the second housing parts extend essentially over the entire handle region and head region of the hand shower.

* * * * *